United States Patent
Montemerlo et al.

(10) Patent No.: US 8,612,135 B1
(45) Date of Patent: Dec. 17, 2013

(54) METHOD AND APPARATUS TO LOCALIZE AN AUTONOMOUS VEHICLE USING CONVOLUTION

(75) Inventors: Michael Steven Montemerlo, Mountain View, CA (US); Sebastian Thrun, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/396,153

(22) Filed: Feb. 14, 2012

(51) Int. Cl.
*G01C 21/00* (2006.01)
*G01C 21/12* (2006.01)
*G01C 21/34* (2006.01)
*G01C 21/36* (2006.01)

(52) U.S. Cl.
USPC .......................... 701/400; 701/409; 701/450

(58) Field of Classification Search
USPC ......... 701/28, 400, 408–478, 478.5, 479–541
See application file for complete search history.

(56) References Cited

U.S. PATENT DOCUMENTS

| | | | |
|---|---|---|---|
| 8,044,857 B2 * | 10/2011 | Maenpa et al. | 342/368 |
| 2007/0003107 A1 * | 1/2007 | Wei et al. | 382/104 |
| 2009/0030605 A1 * | 1/2009 | Breed | 701/208 |
| 2010/0076642 A1 * | 3/2010 | Hoffberg et al. | 701/29 |

* cited by examiner

*Primary Examiner* — Mary Cheung
*Assistant Examiner* — Atul Trivedi
(74) *Attorney, Agent, or Firm* — Lerner, David, Littenberg, Krumholz & Mentlik, LLP

(57) ABSTRACT

Aspects of the disclosure relate generally to an autonomous vehicle accessing portions of a map to localize itself within the map. More specifically, one or more convolution scores may be generated between a prior map and a current map. Convolution scores may be generated by applying a fast Fourier transform on both the prior and current maps, multiplying the results of the transforms, and taking the inverse fast Fourier transform of the product. Based on these convolution scores, an autonomous vehicle may determine the offset between the maps and localize itself relative to the prior map.

19 Claims, 8 Drawing Sheets

100

METHOD AND APPARATUS TO LOCALIZE AN AUTONOMOUS VEHICLE USING CONVOLUTION

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

Such vehicles are equipped with various types of sensors in order to detect objects in the surroundings. For example, autonomous vehicles may include lasers, sonar, radar, cameras, and other devices which scan and record data from the vehicle's surroundings. These devices in combination (and in some cases alone) may be used to build 3D models of a vehicle's precise location and the objects detected in the vehicle's surrounding.

In addition to building a 3D model, a vehicle may use one or more maps to detect and acquire information about its surroundings. A map may, for example, be used to determine the layout of roads in a vehicle's surrounding area.

BRIEF SUMMARY

A vehicle that is navigating along a path may want to compare the 3D model it is building with its sensors to the one or more maps that depict the surrounding area. Through this comparison, a vehicle may determine its precise location relative to the one or more maps—a process referred to as localization.

One aspect of the present technology provides a method for controlling a vehicle, the method comprising determining a current location of the vehicle receiving prior map information associated with the current location of the vehicle, receiving current map information associated with the current location of the vehicle, and generating, using a processor, a score image based on the prior map information and the current map information. The score image may be generated using a fast Fourier transform. The method may further comprise identifying a plurality of offsets between the prior map information and current map information, determining, using the score image, whether a given one of the plurality of offsets represents a shift between the prior map information and the current map information, and correcting the position of the vehicle associated with the prior map information based on the given offset. Determining the current location of the vehicle may comprise receiving data from a geographic position component, identifying map information based on the received data, and correcting the current location of the vehicle based on the identified map information.

Another aspect of the technology provides a method for controlling a vehicle, the method comprising determining a current location of the vehicle, receiving prior map information associated with the current location of the vehicle, receiving current map information associated with the current location of the vehicle, identifying a plurality of offsets between the prior map information and current map information, generating, using a processor, a plurality of convolution scores based on the plurality of offsets, determining, based on the plurality of convolution scores whether a given one of the plurality of offsets represents a shift between the prior map information and current map information, and determining a position of the vehicle within the prior map information based on the given offset.

Yet another aspect of the technology provides an apparatus comprising a processor in communication with a memory and configured to execute instructions stored in the memory to determine a current location of the vehicle, the memory storing instructions and map information associated with the current location of the vehicle. The processor may be configured to execute the instructions stored in the memory to receive prior map information associated with the current location of the vehicle, receive current map information associated with the current location of the vehicle, and generate a score image based on the prior map information and the current map information, wherein the score image is generated using a fast Fourier transform. The processor may further identify a plurality of offsets between the prior map information and current map information, determine, using the score image, whether a given one of the plurality of offsets represents a shift between the prior map information and the current map information, and determine a position of the vehicle associated with the prior map information based on the given offset.

A further aspect of the technology provides an apparatus comprising a processor in communication with a memory and configured to execute instructions stored in the memory to determine a current location of the vehicle, the memory storing instructions and map information associated with the current location of the vehicle. The processor may be configured to execute the instructions stored in the memory to receive prior map information associated with the current location of the vehicle, receive current map information associated with the current location of the vehicle, identify a plurality of offsets between the prior map information and current map information, and generate a plurality of convolution scores based on the plurality of offsets, Based on the plurality of convolution scores, the processor may further determine whether a given one of the plurality of offsets represents a shift between the prior map information and current map information. Based on the given offset, the processor may determine a position of the vehicle within the prior map information.

DETAILED DESCRIPTION

Aspects of the disclosure relate generally to localizing an autonomous vehicle relative to a map. As a vehicle navigates a roadway, it may have access to a previously generated map based on its location. Furthermore, the vehicle may generate or have access to a currently generated (e.g., real-time) map based on its surroundings. Because both the current map and previously generated map depict approximately the same locations, the current map may be similar to the previous map. The current map, however, may be shifted relative to the previously generated map. One way to localize a vehicle within a previously generated map is to compare the current map with the previously generated map to determine the shift between the two maps. That is, because the position of a vehicle within a current map may be known, determining the shift between maps may assist in determining the location of the vehicle within the previously generated map.

Figure 1:
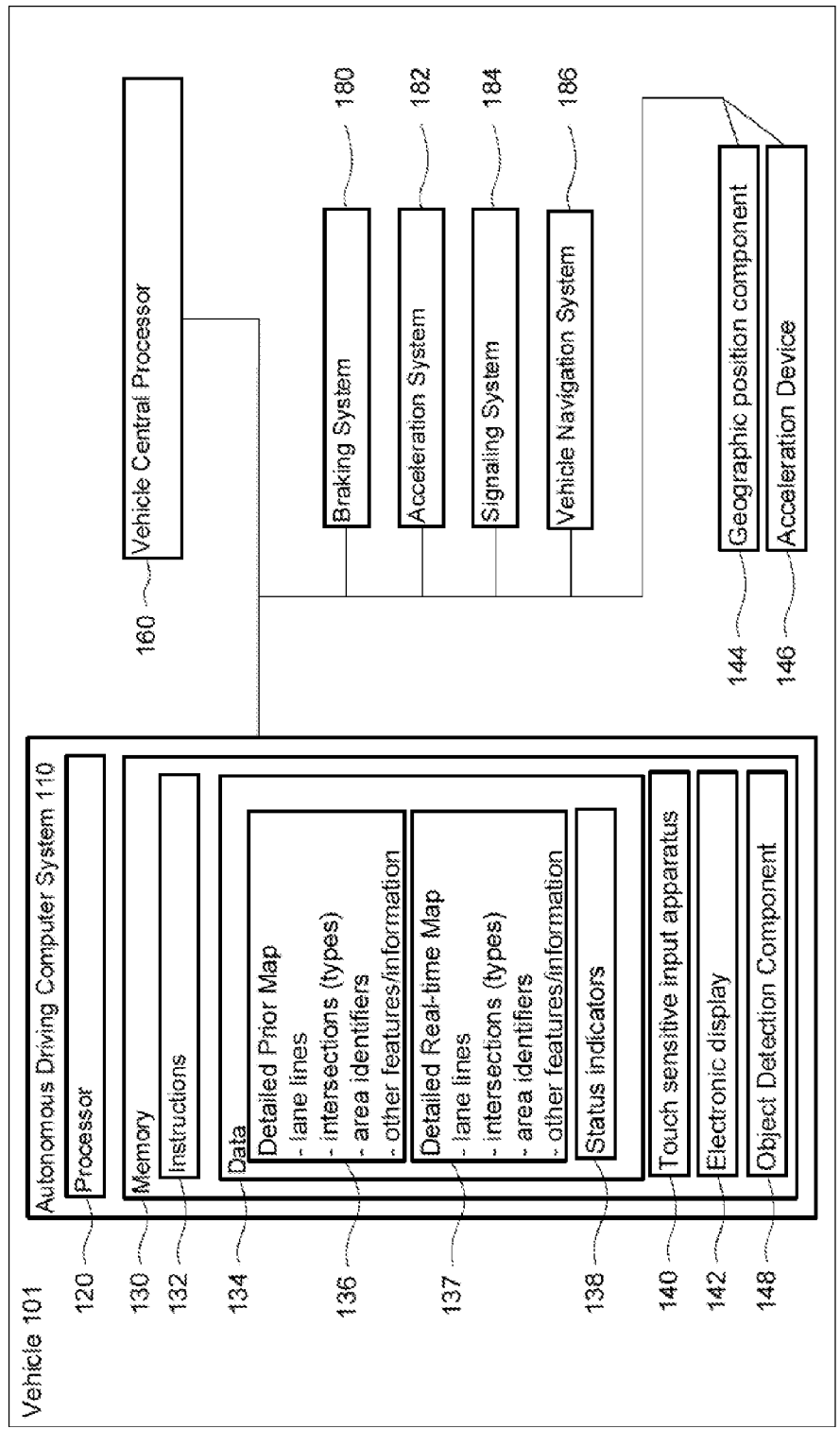
FIG. 1 is a functional diagram of a system in accordance with an exemplary embodiment.

As shown in FIG. 1, an autonomous driving system 100 in accordance with one exemplary embodiment includes a vehicle 101 with various components. While certain aspects of embodiments described herein are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, farm equipment, construction equipment, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although aspects of the claimed subject matter are not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as a commercially available CPU. Alternatively, the processor may be a dedicated device such as an ASIC or other hardware-based processing device. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, the memory may be a hard drive or other storage media located in a housing different from that of computer 110. Accordingly, references to a processor or computer or memory will be understood to include references to a collection of processors, computers, or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute one or more maneuvers.

Computer 110 may include all of the components normally used in connection with a computer, including a display 142 (e.g., a monitor having a screen, a small LCD touch-screen or any other electrical device that is operable to display information), user input (e.g., a mouse, keyboard, touch screen and/or microphone), as well as various sensors (e.g., a video camera) for gathering explicit (e.g., a gesture) or implicit (e.g., "the person is asleep") information associated with a driver or other person or the vehicle 101. In one example, computer 110 may be an autonomous driving computing system incorporated into vehicle 101.

Figure 2:
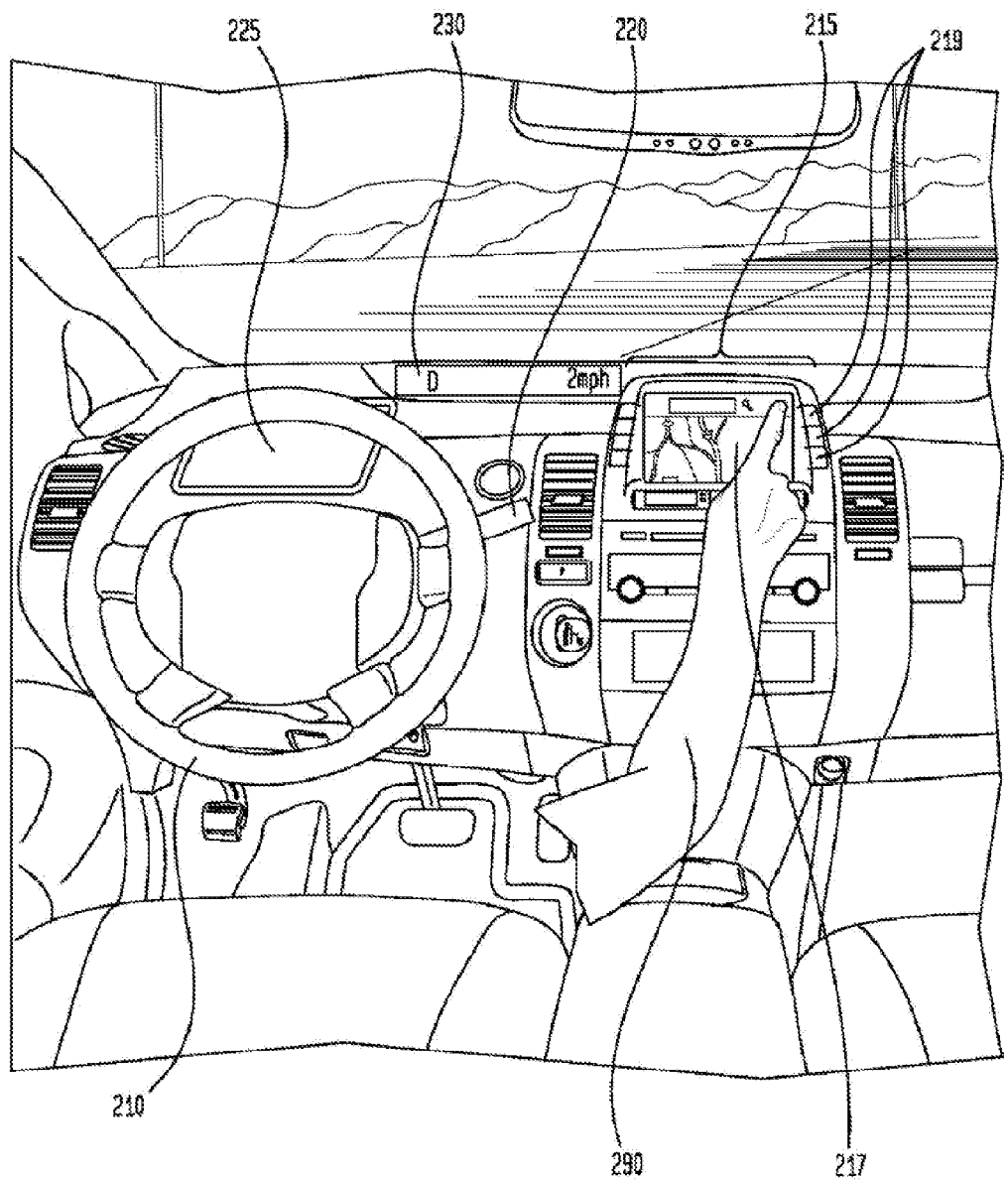
FIG. 2 is a design of the interior of an autonomous vehicle in accordance with an exemplary embodiment.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as touch screen 217 and/or button inputs 219, for activating or deactivating one or more autonomous driving modes and for enabling a driver or passenger 290 to provide information, such as a navigation destination, to the autonomous driving computer 110.

Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may be capable of communicating with various components of the vehicle. For example, as shown in FIG. 1, computer 110 may be in communication with the vehicle's central processor 160 and may send and receive information from the various systems of vehicle 101, for example braking 180, acceleration 182, signaling 184, and navigation 186 systems in order to control the movement, speed, etc., of vehicle 101. In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The vehicle may also include other devices in communication with computer 110, such as an accelerometer, gyroscope or another direction/speed detection component as shown by accelerator device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, the computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger car, the car may include a laser mounted on the roof or other convenient location. In one aspect, the laser may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors may allow the vehicle to evaluate and potentially respond to its environment in order to maximize safety for passengers as well as objects or people in the environment.

In addition to the sensors described above, the computer may also use input from sensors typical in non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors may provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, data 134 may include detailed map information 136, e.g., highly detailed maps identifying the shape and elevation of roadways, lane lines, intersections, crosswalks, speed limits, traffic signals, buildings, signs, real time traffic information, or other such objects and information. The map information may include explicit speed limit information associated with various roadway segments. The speed limit data may be entered manually or scanned from previously taken images of a speed limit sign using, for example, optical character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, it will be understood that this information may include one or more roadgraphs or a graph network of information such as roads, lanes, intersections, and the connections between these features. In this regard, the roadgraph need not be image based (for example, raster). Each feature may be stored in a cell or grid of the roadgraph and associated with various information such as a geographic location and whether or not it is linked to other related features. For example, a stop sign may be linked to a road and an intersection, etc.

Figure 3:
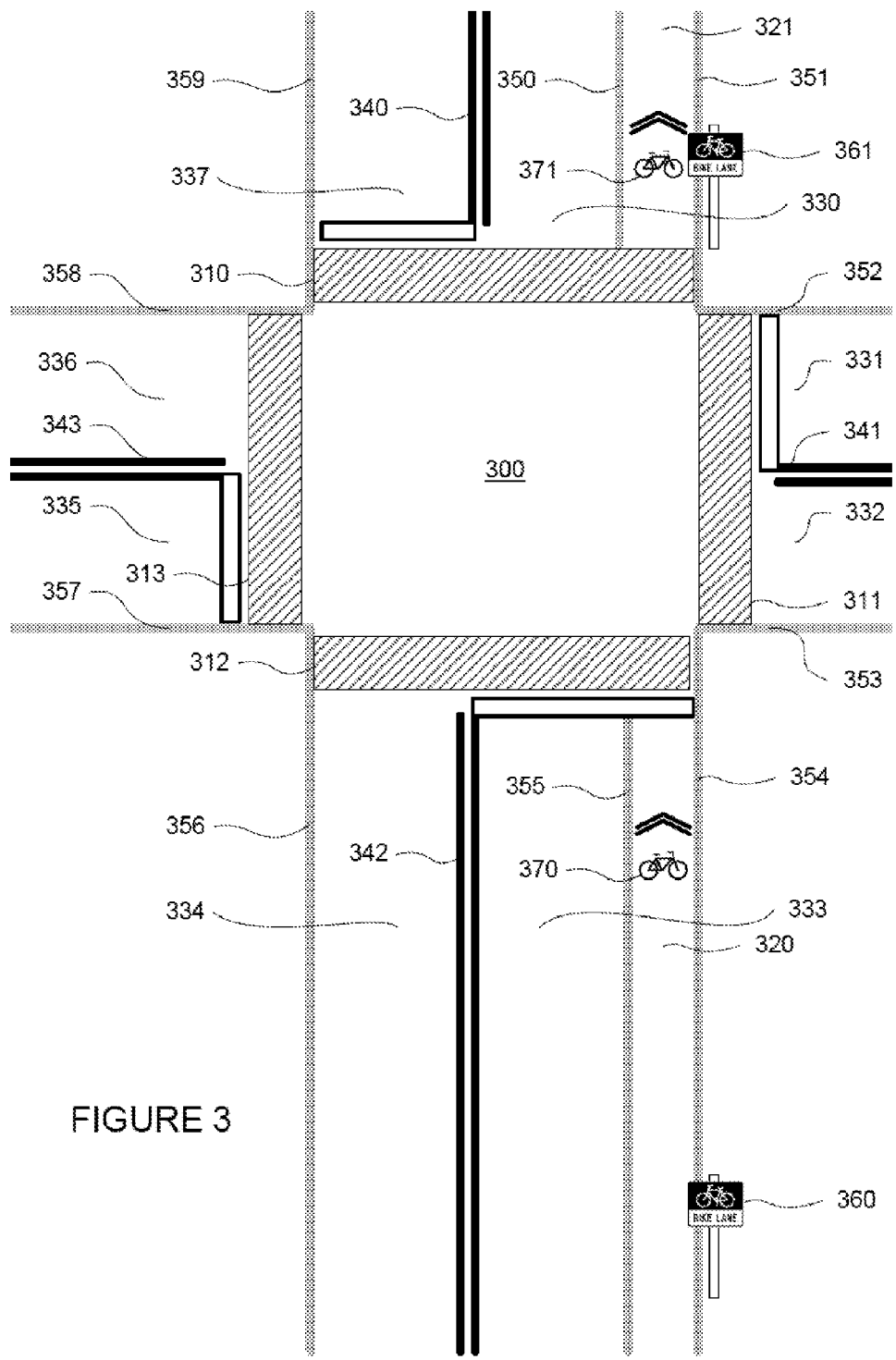
FIG. 3 is a birds-eye view of an intersection in accordance with an exemplary embodiment.

FIG. 3 depicts a birds-eye view of an exemplary intersection 300 which may be the subject of detailed map 136. The intersection may include a number of different features such as crosswalks 310-313, bicycle lanes 320-321, driving lanes 330-337, and lane lines 340-343 and 350-359. Intersection 300 may also include indicators such as signs 350-351 and 360-361 identifying specific areas such as the bicycle lanes 320-321. Other features such as traffic signals or stop signs may also be present, but are not shown in this figure.

Although intersection 300 includes four roadways meeting perpendicular to one another, various other intersection configurations may also be employed. It will be further understood that aspects described herein are not limited to intersections, but may be utilized in conjunction with various other traffic or roadway designs which may or may not include additional features or all of the features described with respect to intersection 300.

Figure 4:
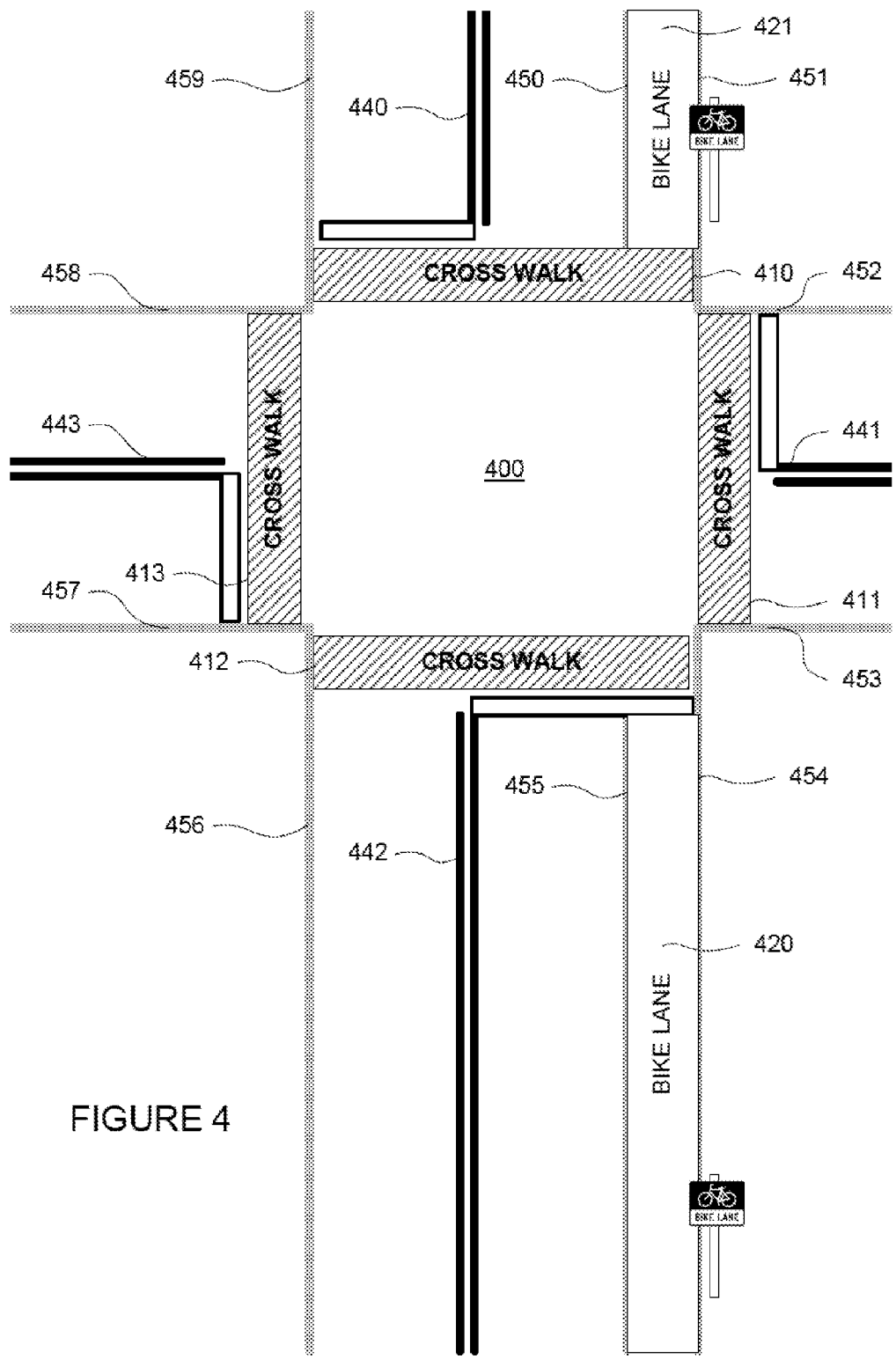
FIG. 4 is a roadgraph in accordance with an exemplary embodiment.

Data about the intersection (or other portions of the roadway) may be collected, for example, by driving a vehicle equipped with various object detection components. The data may be processed in order to generate roadgraph information describing the roadway. For example, as shown in FIG. 4, based on laser, geographic location, and other information collected while driving a vehicle through intersection 300, a roadgraph 400 of the intersection may be generated. Similar to intersection 300, roadgraph 400 may include various features such as lanes 430-437, and lane lines 440-443 and 450-459. Each of these features may be associated with geographic location information identifying where these objects may be located in the real world (for example in intersection 300). Again, although roadgraph 400 is depicted as an image-based map, it will be understood that this information may be stored as a grid of data or other information describing the various features and their relationships.

A roadgraph may also include annotations or other indicators identifying or classifying particular areas of the roadgraph. For example, the roadgraph may include tags, flags or other identifiers for areas of the roadway which are known to be generally occupied by persons not in another vehicle, such as pedestrians or bicyclists. Returning to FIG. 4, the roadgraph may include, for example, crosswalk identifiers 410-413 and bicycle lane identifiers 420-421. These identifiers may define the geographic boundaries of these areas in the roadgraph. As will be described in more detail below, this information may be downloaded to or transmitted to an autonomous vehicle's computer and stored in memory to be used to identify and react, if necessary, to various objects.

In addition to the operations described above and illustrated in the figures, various operations will now be described. It should be understood that the operations discussed herein do not have to be performed in the precise order described below. Rather, various steps can be handled in a different order or simultaneously, and steps may also be added or omitted.

Figure 5A:
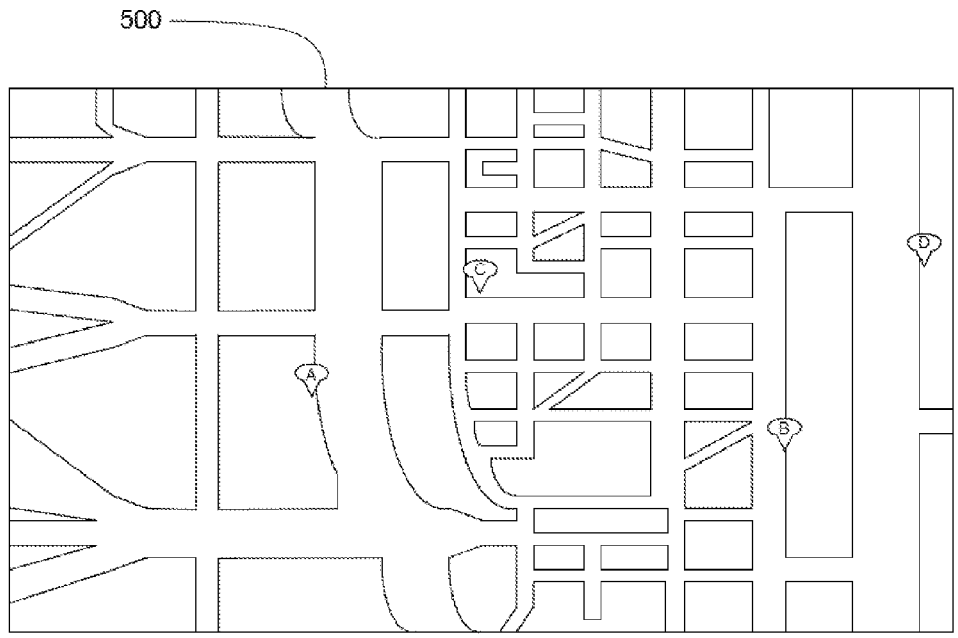
FIG. 5A is a map in accordance with an exemplary embodiment.

FIG. 5A is an exemplary illustration of a map 500 depicting a network of roads. Map 500 may be generated in a number of ways—including by one or more vehicles that may have previously navigated the depicted network of roads—and may assist in further vehicle navigation. A vehicle navigating a roadway may load and use map 500 to help determine the location of objects in the vehicle's surrounding area. The section of map used by a vehicle may be determined by the vehicle's location using, for example, GPS.

Figure 5B:
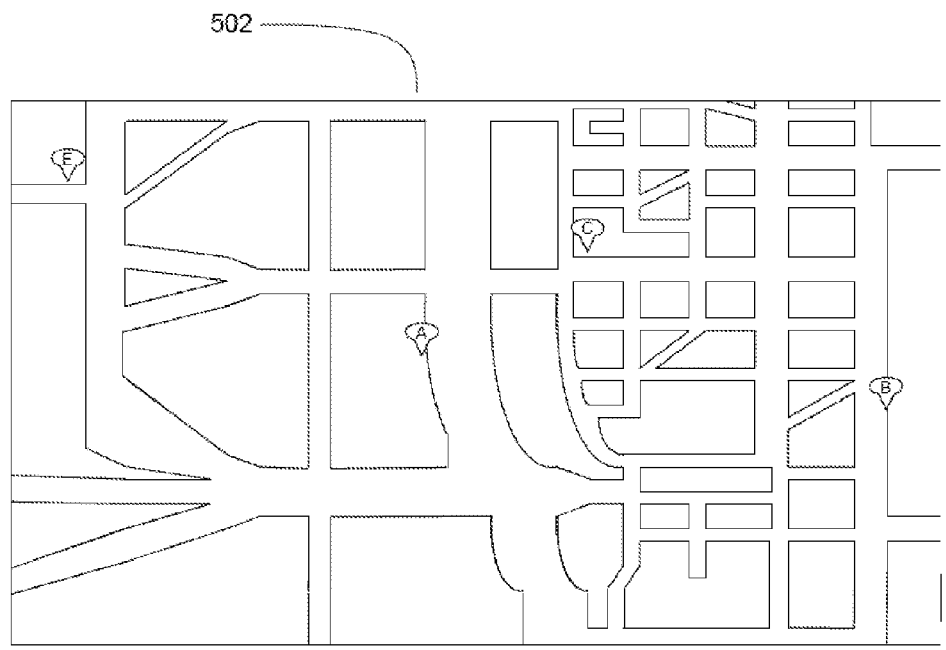
FIG. 5B is a map in accordance with an exemplary embodiment.

FIG. 5B is an exemplary illustration of a current map 502. A current map 502 may be generated in real-time by an autonomous vehicle. A vehicle may detect its position relative to the current map 502 based on, for example, sensor data it collects as it navigates a roadway. Map 502 may be a local view of the surrounding area compiled by a vehicle's sensors and may include similar details as map 500. For example, map 502 may contain some of the same roadways, lane lines, intersections, crosswalks, speed limits, traffic signals, buildings, signs, etc. of map 500. Though map 502 may be similar to map 500, map 502 may be centered at a different location than map 500. As a result, map 502 may be spatially offset from map 500.

Figure 6A:
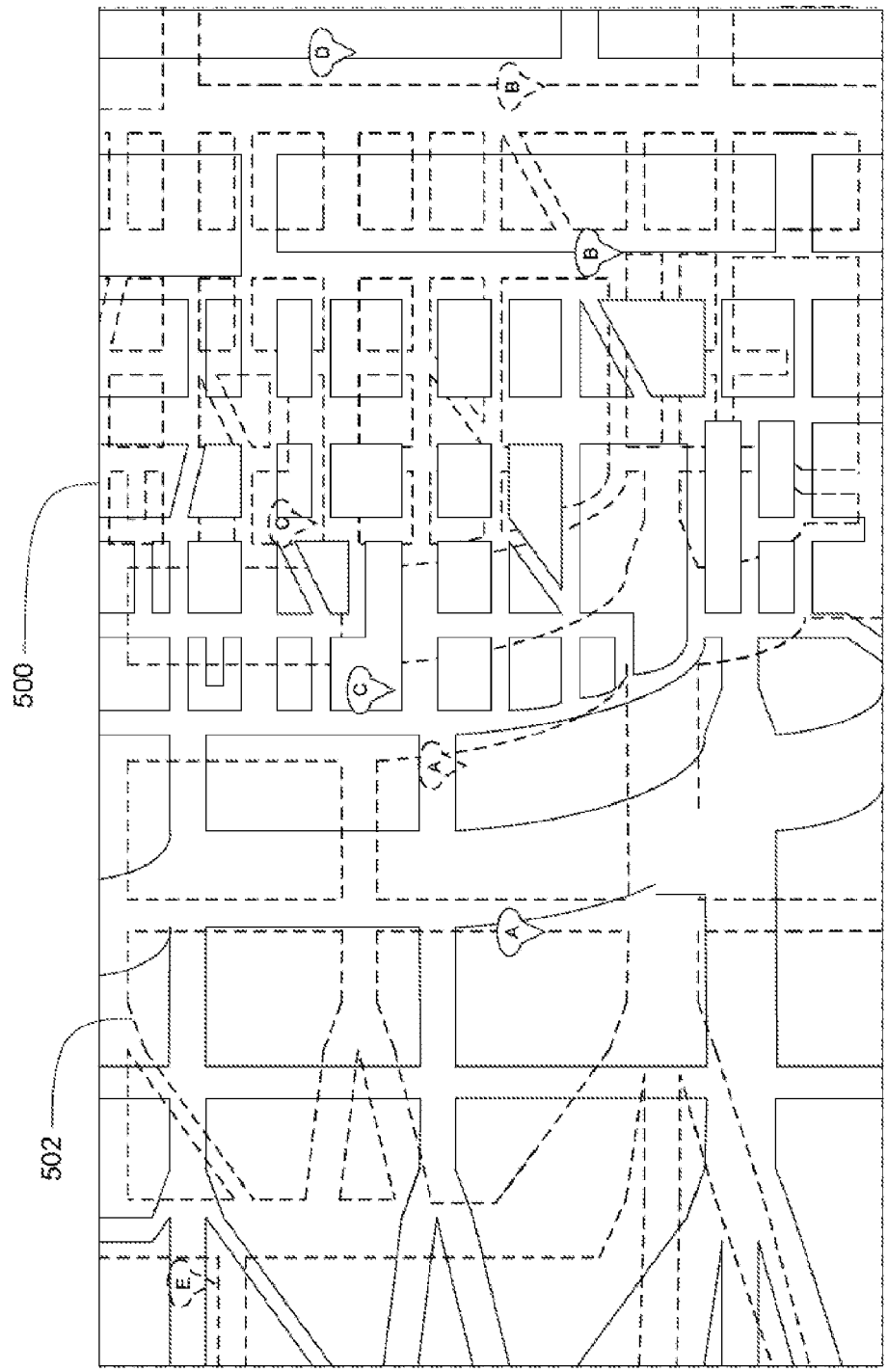
FIG. 6A is an overlay of two maps in accordance with an exemplary embodiment.
Figure 6B:
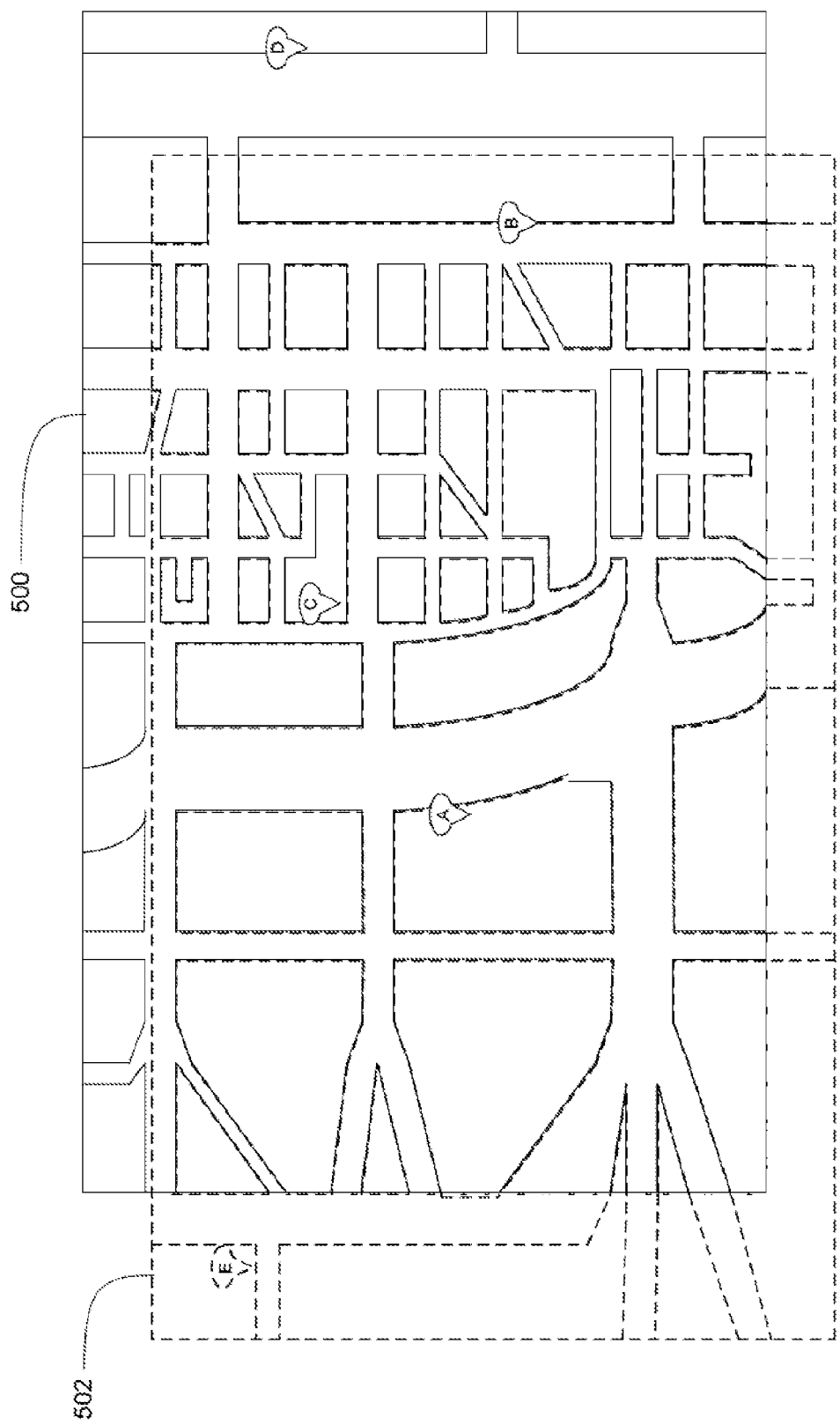
FIG. 6B is an overlay of two maps in accordance with an exemplary embodiment.

FIG. 6A depicts an overlay of map 502 (shown with dashed lines) with map 500 (shown with solid lines). FIG. 6B depicts an offset overlay of map 502 with map 500. As illustrated in the offset maps of FIG. 6B, various objects (e.g., lane lines) in map 502 may correspond to objects in map 500. That is, map 502 may be a shifted version of map 500. Determining the offset between a previously generated map and a current map generated by a vehicle may assist the vehicle to both localize itself within the previous map and determine how the current map corresponds to the previous map. As a result, a vehicle may be able to determine its location within the previously generated map by determining the shift between the previous map and its current map. That is, the vehicle may be localized relative to the prior map based on its position within the current map and the shift between the two maps.

An estimate of the correct shift between a current map and a previously generated map may be determined using convolution. Two or more maps, such as maps 502 and 500, may be used as inputs to a convolution operation performed by a processor 120. Convolving two maps may include lining up two map images at a certain offset and determining a convolution score. Furthermore, processor 120 may determine convolution scores for any number of offsets between map images. Processor 120 may then analyze the resulting convolution scores to determine which offset represents the correct shift between the two maps. For example, processor 120 may determine that the offset represented by the largest convolution score represents the correct shift between two maps.

In one embodiment, a convolution score for two images may be determined by performing a region-by-region (e.g., pixel-by-pixel) comparison between the two images. Returning to FIG. 6A, maps 500 and 502 represent two map images that are overlaid without an offset. Processor 120 may compare each pixel from map 500 with the corresponding overlaid pixel from map 502 by, for example, multiplying together each pair of overlaid pixel values. The resulting products may be summed to determine a score. Turning to FIG. 6B, a convolution score may be determined using the same pixel-by-pixel comparison. Processor 120 may then compare the resulting convolution scores to determine which offset more accurately estimates the shift between maps 500 and 502.

In another embodiment, a multitude of convolution scores between two images may be determined using a fast Fourier transform (FFT), such as, for example, the Cooley-Tukey FFT. For example, processor 120 may perform an FFT for each of two images, multiply the FFT results together, and perform an inverse FFT on the product. These operations result in a score image—where the pixels of a score image represent a convolution score for a particular offset. These score image pixels may be addressable using a coordinate system. For example, the top-left pixel of an image may be represented by the coordinates (0,0). Moreover, the pixels immediately to the right and immediately below pixel (0,0) may, for example, have the coordinates (1,0) and (0,1), respectively. As such, each pixel may be addressable by its coordinates.

The (n,m) pixel of a score image may represent a convolution score of two images where one image is shifted n pixels horizontally and m pixels vertically. For example, the top-left pixel (e.g., pixel (0,0)) of a score image may represent the convolution score of two images overlaid without an offset. Similarly, the pixel immediately to the right of the top-left pixel (e.g., pixel (1,0)) of the score image may represent, for example, the convolution score of two images with one image shifted horizontally by one pixel.

Returning to FIGS. 5A and 5B, processor 120 may determine a score image for maps 500 and 502 by performing an FFT on each map image, multiplying together the results of the FFTs, and taking the inverse FFT of the product. The score image may then be analyzed to determine the shift between the two maps. For example, the (0,0) pixel of the score image may represent the convolution score for the configuration of maps 500 and 502 shown in FIG. 6A.

Figure 7:
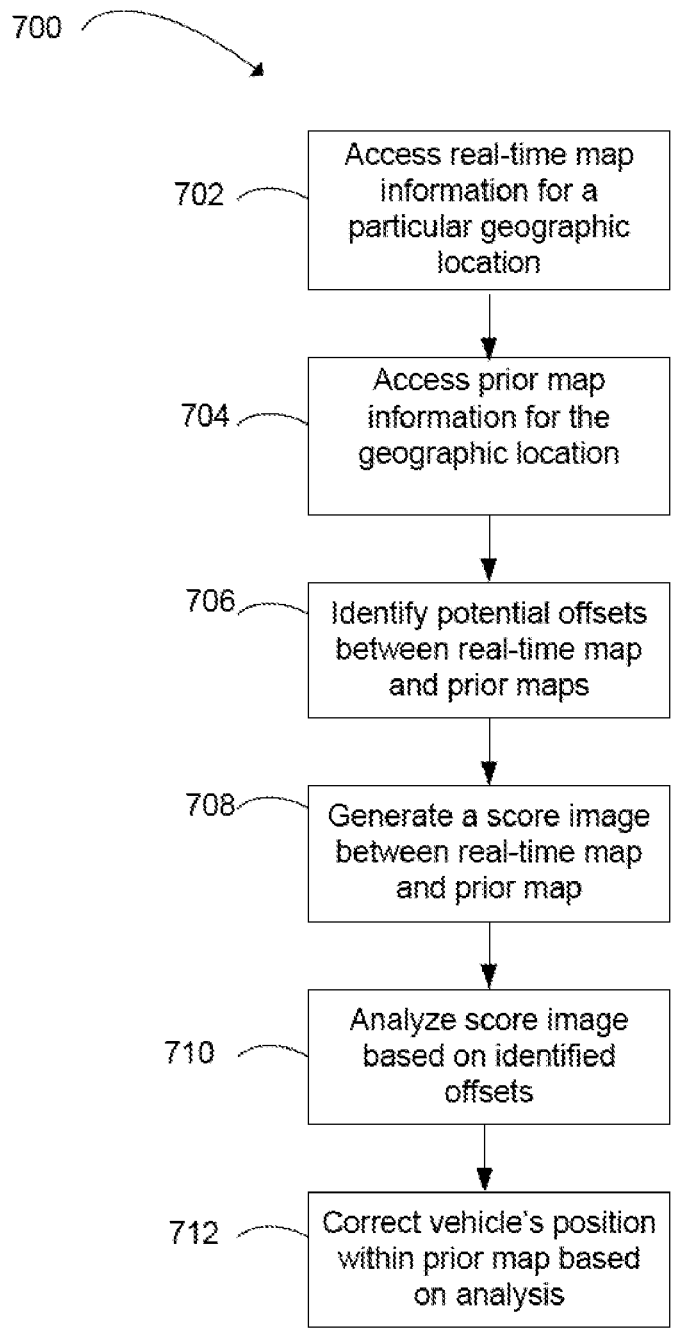
FIG. 7 is a flow diagram for localizing an autonomous vehicle in accordance with an exemplary embodiment.

FIG. 7 is an exemplary flow diagram depicting aspects of a process 700 for localizing an autonomous vehicle. An autonomous vehicle may be operable to generate one or more convolution scores to assist in localization. At block 702, a processor 120 may access and use a current map to get a local view of a vehicle's surroundings.

At block 704, the processor 120 may access a portion of a prior map based on the vehicle's location. The portion of the prior map may be selected based on, for example, data received from a GPS. At block 706, the processor 120 may use the current map to generate or access one or more hypotheses corresponding to various offsets between the current map and previously generated map. These hypotheses may be, for example, pixel coordinates of a score image. The hypotheses may be generated, for example, based on previously identified offsets between prior and current maps.

At block 708, the processor 120 may generate a score image to test the hypotheses generated at block 706. This score image may be generated using both the current map and prior map.

At block 710, the processor 120 may analyze the score image pixels corresponding to each hypothesized offset to determine which offset may be the most accurate. This analysis may include accessing and comparing the pixel values corresponding to each hypothesis. The most accurate offset may be, for example, the pixel with the highest value.

At block 712, the processor 120 may use the determined offset to correct a vehicle's position within the prior map. Correcting a vehicle's position may include localizing the vehicle's position relative to the prior map based on, for example, the determined offset and the vehicle's position in the current map.

According to one example, the hypotheses generated in block 706 may be maintained and updated over time using a probabilistic state estimator. The state estimator may model the accuracy of the vehicle's sensors and use these models and the convolution scores to update the set of hypotheses. The maintaining and updating of the hypothese may be implemented using a filter, such as a Kalman Filter, a particle filter, or a histogram filter.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method for controlling a vehicle, the method comprising:
    determining a current location of the vehicle;
    receiving prior map information associated with the current location of the vehicle;
    receiving current map information associated with the current location of the vehicle;
    generating, using a processor, a score image based on the prior map information and the current map information, wherein the score image is generated using a fast Fourier transform;
    identifying a plurality of offsets between the prior map information and current map information;
    determining, using the score image, whether a given one of the plurality of offsets represents a shift between the prior map information and the current map information; and
    correcting the position of the vehicle associated with the prior map information based on the given offset.

2. The method of claim 1, wherein determining the current location of the vehicle comprises:
    receiving data from a geographic position component;
    identifying map information based on the received data; and
    correcting the current location of the vehicle based on the identified map information.

3. The method of claim 1, wherein the current map information is based on sensor information received by the vehicle.

4. The method of claim 3 wherein the current map information is image based.

5. The method of claim 1, wherein the prior map information is image based.

6. The method of claim 1, wherein the score image is represented by a plurality of pixels, and wherein the pixels correspond to convolution scores.

7. The method of claim 6, wherein the plurality of offsets represents one or more of the plurality of pixels.

8. The method of claim 7, wherein one or more of the plurality of offsets is associated with a horizontal component and a vertical component.

9. The method of claim 8, wherein a given convolution score represents the convolution score between the prior map information and current map information at a given offset.

10. The method of claim 9, wherein the given one of the plurality of offsets is the offset associated with the one or more pixels corresponding to the largest convolution score.

11. A method for controlling a vehicle, the method comprising:
    determining a current location of the vehicle;
    receiving prior map information associated with the current location of the vehicle;
    receiving current map information associated with the current location of the vehicle;
    identifying a plurality of offsets between the prior map information and current map information;
    generating, using a processor, a plurality of convolution scores based on the plurality of offsets;
    determining, based on the plurality of convolution scores whether a given one of the plurality of offsets represents a shift between the prior map information and current map information; and
    determining a position of the vehicle within the prior map information based on the given offset.

12. The method of claim 11, wherein determining the current location of the vehicle comprises:
    receiving data from a geographic position component;
    identifying map information based on the received data; and
    correcting the current location of the vehicle based on the identified map information.

13. The method of claim 11, wherein the current map information is based on sensor information received by the vehicle.

14. The method of claim 13 wherein the current map information is image based.

15. The method of claim 11, wherein the prior map information is image based.

16. The method of claim 11, wherein a convolution score is determined for each of the identified offsets.

17. The method of claim 16, wherein the given one of the plurality of offsets is the identified offset associated with the largest convolution score.

18. An apparatus comprising:
    a processor in communication with a memory and configured to execute instructions stored in the memory to determine a current location of the vehicle;
    the memory storing instructions and map information associated with the current location of the vehicle;
    the processor configured to execute the instructions stored in the memory to:

receive prior map information associated with the current location of the vehicle;

receive current map information associated with the current location of the vehicle;

generate a score image based on the prior map information and the current map information, wherein the score image is generated using a fast Fourier transform;

identify a plurality of offsets between the prior map information and current map information;

determine, using the score image, whether a given one of the plurality of offsets represents a shift between the prior map information and the current map information; and determine a position of the vehicle associated with the prior map information based on the given offset.

19. An apparatus comprising:

a processor in communication with a memory and configured to execute instructions stored in the memory to determine a current location of the vehicle;

the memory storing instructions and map information associated with the current location of the vehicle;

the processor configured to execute the instructions stored in the memory to:

receive prior map information associated with the current location of the vehicle;

receive current map information associated with the current location of the vehicle;

identify a plurality of offsets between the prior map information and current map information;

generate a plurality of convolution scores based on the plurality of offsets;

determine, based on the plurality of convolution scores, whether a given one of the plurality of offsets represents a shift between the prior map information and current map information; and determine a position of the vehicle within the prior map information based on the given offset.

* * * * *